United States Patent [19]

Limp

[11] 4,172,378
[45] Oct. 30, 1979

[54] LIQUEFIED GAS LEAKAGE CALIBRATION SOURCE

[75] Inventor: Hans Limp, Cologne, Fed. Rep. of Germany

[73] Assignee: Leybold-Heraeus GmbH & Co. KG, Cologne, Fed. Rep. of Germany

[21] Appl. No.: 868,335

[22] Filed: Jan. 10, 1978

[30] Foreign Application Priority Data

Jan. 19, 1977 [DE] Fed. Rep. of Germany ....... 2702002

[51] Int. Cl.² .................................................. G12B 13/00
[52] U.S. Cl. ............................................................ 73/1 G
[58] Field of Search ................... 73/1 G, 1 R, 4 R, 40

[56] References Cited

U.S. PATENT DOCUMENTS

| 3,209,579 | 10/1965 | Roberts | 73/1 G |
| 3,516,278 | 6/1970 | Klein et al. | 73/1 G |

Primary Examiner—S. Clement Swisher
Assistant Examiner—Joseph W. Roskos
Attorney, Agent, or Firm—Spencer & Kaye

[57] ABSTRACT

A calibrated gas source for testing leakage indicators composed of a housing divided into two chambers by a partition having a gas passage between the chambers, a mass of liquefied gas filling one of the chambers, a valve associated with the passage for permitting gas to pass from the one chamber to the other chamber when it is under a certain excess pressure, and a capillary passage between the other chamber and the surrounding environment.

3 Claims, 1 Drawing Figure

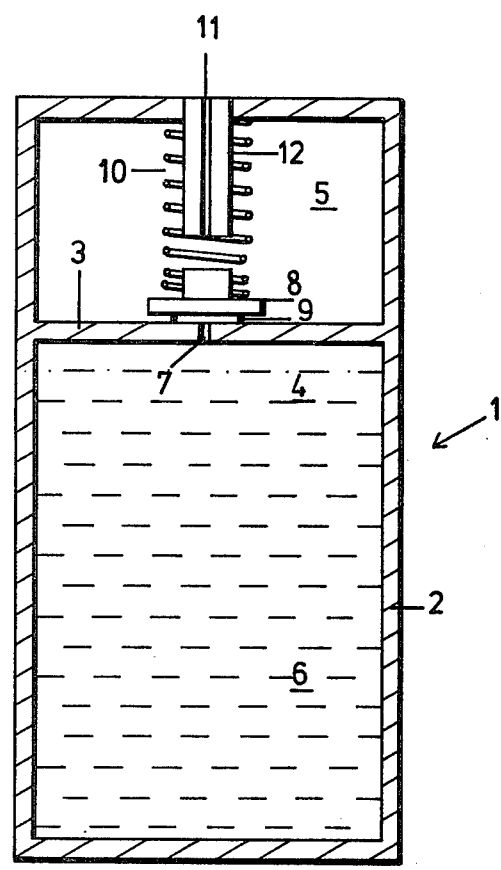

LIQUEFIED GAS LEAKAGE CALIBRATION SOURCE

BACKGROUND OF THE INVENTION

The present invention relates to a liquefied natural gas leakage testing device or calibrated source which includes a housing divided into two chambers by a gas-permeable partition.

Leakage testing devices provided with their own gas supply are used in checking and adjusting leakage indicators. A basic distinction is made between leakage testing devices in which the gas supply is in a gaseous state, e.g. helium, and liquefied, natural gas leakage testing devices in which the medium constantly flowing out from the leakage testing device is stored in liquefied form, e.g. hydrocarbon gases, in particular fluorinated and chlorinated hydrocarbon gases. In order to perform satisfactorily, leakage testing devices should have a calibrated, constant leakage rate for as long as possible, as a rule several years.

A liquefied natural gas leakage testing device is known in which the partition is formed by a membrane. The gas evaporating from one of the two chambers constantly diffuses through this membrane and thus passes to the further chamber, connected to the surroundings via a relatively large opening. The leakage rate of this prior art leakage testing device is determined by the thickness and effective cross-section of the membrane.

A particular problem in the manufacture of such leakage testing devices is to provide membranes that are suitable for this purpose, in particular for leakages of the order of magnitude of $<10^{31\ 6}$ and $>10^{-3}$ m bar. l/s, because it is difficult to manufacture leakage testing devices for such leakage rates since the effective membrane cross-section in the first case must be extremely small, and in the second case must be extremely large.

These difficulties would not occur if capillaries were used. However, capillaries cannot be used in leakage testing devices which employ a liquefied Freon 12 (dichlorodifluoromethane) supply. In practice it has been found that as soon as the capillaries come into contact with the liquid either they become blocked by constituents which volatize sparingly and with difficulty or the leakage rate is greatly reduced. The leakage testing device thus becomes unusable. Capillaries are therefore used only in leakage testing devices with gaseous test gas supplies, which however are not suitable for all purposes, since with leakage rates of $1 \times 10^{-6}$ m bar. l/s and above the storage container would have to be unmanageably large.

SUMMARY OF THE INVENTION

It is an object of the present invention to provide a liquefied natural gas leakage testing device of the type described above which can utilize a capillary as the element for determining the leakage rate.

This and other objects of the invention are achieved by connecting the chamber containing the liquefied natural gas to the further chamber via a gas passage bore in the partition, provided with a spring-loaded valve, and by placing the further chamber in communication with the surroundings via a capillary. With a leakage testing device of this type, it is possible to set the spring loading of the valve so that the test gas accumulates in the further chamber under such a pressure that it remains absolutely gaseous. There is therefore no danger of the capillary, which determines the leakage rate and provides the communication with the outside environment, becoming blocked or obstructed.

The manufacture of liquefied natural gas leakage testing devices having defined leakage rates has thus become possible through the invention. Further advantages are a low temperature dependence and, as long as a liquefied natural gas supply store is present, practically no change in leakage rate with time.

BRIEF DESCRIPTION OF THE DRAWING

The sole drawing FIGURE is a cross-sectional, elevational view of a preferred embodiment of the invention.

DESCRIPTION OF THE PREFERRED EMBODIMENT

The leakage testing device 1 as shown in the FIGURE consists of a housing 2 which is subdivided by a partition 3 into a larger chamber 4 and a smaller chamber 5. The gas supply 6, in the form of liquefied gas, is located in the chamber 4.

The partition 3 is provided with a relatively large opening 7, which is associated with a valve plate 8 and seal 9 at the side of the partition which faces the smaller chamber side. The valve plate 8 is actuated by a compression spring 10, which is supported on the wall situated opposite the partition 3. The chamber 5 communicates with the environment via a capillary 11. A small tube 12 in which the capillary is formed lies approximately concentrically with respect to the opening 7 in the partition 3, and in this way it is possible for the small tube 12 to act simultaneously as a guide for the spring 10. The small tube 12 also forms a stop means for the valve plate 8 when the latter is in its open position.

The operation of the leakage testing device according to the invention will be described, it being assumed that Frigen 12 (Freon 12) is in the chamber 4 (Frigen is a trademark of Hoescht AG, Federal Republic of Germany). The spring 10 is arranged so that the Frigen can escape from the chamber 4 only when it is under an excess pressure of approximately 3 to 4 atmospheres. Since Frigen has a vapor pressure of 4.8 atmospheres at 20° C., an approximately constant pressure of 0.8 to 1.8 atmospheres is permanently produced in the chamber 5. At this pressure Frigen remains absolutely gaseous in the chamber 5 and the capillary 11 therefore cannot become obstructed. When using other media as test gases, the pressure of the spring 10 must be suitably adjusted to the vapor pressure properties of the gas in question.

The dimensions of a preferred embodiment are: 40–80 mm in diameter and approximately 200 mm in height. The volume of chamber 4 is about two times bigger than the volume of chamber 5. The opening 7 in the partition 3 has a diameter of approximately 1.5 mm. The diameter of the capillary 11 is approximately $5 \cdot 10^{-3}$ mm. A preferred liquified gas is dichlordifluormethan ($CF_2Cl_2$).

It will be understood that the above description of the present invention is susceptible to various modifications, changes and adaptations, and the same are intended to be comprehended within the meaning and range of equivalents of the appended claims.

What is claimed is:

1. A liquefied natural gas leakage calibration source comprising: a housing; a partition dividing said housing into two chambers and provided with a gas passage extending between said chambers; a mass of liquefied gas filling one of said chambers; spring-loaded valve means operatively associated with said gas passage for permitting gas in said one chamber to flow into the other said chamber only when the pressure in said one chamber exceeds that in the other said chamber by a predetermined amount; and means defining a capillary passage via which the other said chamber communicates with the region outside said housing.

2. An arrangement as defined in claim 1 wherein said means defining a capillary passage comprise a tube projecting into the other said chamber and having said capillary passage formed therein.

3. An arrangement as defined in claim 2 wherein said tube is aligned with said gas passage and said spring-loaded valve means include a valve member arranged to close said gas passage and mounted between said valve member and said tube.

* * * * *